US008347083B1

(12) United States Patent
Scudder (10) Patent No.: US 8,347,083 B1
(45) Date of Patent: Jan. 1, 2013

(54) ENCRYPTED CROSS-ORIGIN COMMUNICATION VIA AN INTERMEDIARY

(75) Inventor: Jeffrey William Scudder, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/343,205

(22) Filed: Jan. 4, 2012

(51) Int. Cl.
*H04L 29/06* (2006.01)

(52) U.S. Cl. ...................................... 713/159
(58) Field of Classification Search ................ 713/159
See application file for complete search history.

(56) References Cited

U.S. PATENT DOCUMENTS

| | | | |
|---|---|---|---|
| 6,321,334 B1* | 11/2001 | Jerger et al. ........................ 726/1 |
| 6,473,800 B1* | 10/2002 | Jerger et al. .................... 709/226 |
| 7,089,425 B2 | 8/2006 | Chan .............................. 713/189 |
| 8,126,434 B2* | 2/2012 | Karaoguz et al. ............. 455/411 |
| 8,145,537 B2* | 3/2012 | Wehmann et al. ........... 705/26.1 |
| 2002/0178187 A1* | 11/2002 | Rasmussen et al. .......... 707/513 |
| 2004/0187027 A1* | 9/2004 | Chan .............................. 713/201 |
| 2004/0193887 A1* | 9/2004 | Foster et al. ................... 713/176 |
| 2005/0102358 A1* | 5/2005 | Gold et al. ..................... 709/204 |
| 2006/0041754 A1* | 2/2006 | Hind et al. ..................... 713/176 |
| 2006/0190619 A1* | 8/2006 | Tenembaum et al. ......... 709/233 |
| 2007/0136201 A1* | 6/2007 | Sah et al. ......................... 705/51 |
| 2007/0136320 A1* | 6/2007 | Sah et al. ....................... 707/100 |
| 2008/0065723 A1* | 3/2008 | Corboy et al. ................. 709/203 |
| 2008/0133735 A1* | 6/2008 | Thayer et al. ................. 709/223 |
| 2009/0288012 A1* | 11/2009 | Hertel et al. ................... 715/738 |
| 2009/0300359 A1* | 12/2009 | Gao et al. ....................... 713/171 |
| 2009/0300742 A1* | 12/2009 | Ahn ................................. 726/6 |
| 2010/0017891 A1* | 1/2010 | Thierbach ....................... 726/29 |
| 2010/0153535 A1* | 6/2010 | Thayer et al. ................. 709/223 |
| 2010/0173580 A1* | 7/2010 | Karaoguz et al. ............ 455/26.1 |
| 2010/0228963 A1* | 9/2010 | Kassab et al. ................. 713/150 |
| 2010/0313248 A1* | 12/2010 | Krivosheev et al. .............. 726/5 |
| 2011/0055912 A1* | 3/2011 | Fusari et al. ..................... 726/8 |
| 2011/0061095 A1* | 3/2011 | Wiseman et al. ................ 726/4 |
| 2011/0143717 A1* | 6/2011 | Karaoguz et al. ............. 455/411 |
| 2011/0154130 A1* | 6/2011 | Helander et al. ............... 714/48 |
| 2011/0246772 A1* | 10/2011 | O'Connor et al. ............ 713/168 |
| 2011/0302653 A1* | 12/2011 | Frantz et al. .................... 726/22 |
| 2011/0321133 A1* | 12/2011 | Grieve ............................. 726/4 |
| 2012/0047365 A1* | 2/2012 | Mercer ......................... 713/168 |
| 2012/0054494 A1* | 3/2012 | Hiribarren et al. ............ 713/176 |

OTHER PUBLICATIONS

Barth et al., Securing Frame Communication in Browsers, In Proceedings of the 17th USENIX Security Symposium, 2008.*
Tang et al., Fortifying Web-Based Applications Automatically, ACM, Oct. 2011.*
Huang et al.,Protecting Browsers from Cross-Origin CSS Attacks, ACM, Oct. 2010.*
Barth et al.,Robust Defenses for Cross-Site Request Forgery, ACM, Oct. 2008.*
Pelizzi et al., A Server- and Browser-Transparent CSRF Defense for Web 2.0 Applications, ACM, Dec. 2011.*

* cited by examiner

*Primary Examiner* — David Garcia Cervetti
(74) *Attorney, Agent, or Firm* — Lerner, David, Littenberg, Krumholz & Mentlik, LLP (57) ABSTRACT

Secure cross-frame communication between frames in a web browser may be achieved using encryption. The communication may occur between frames that pass messages to one another via an untrusted, and potentially malicious, intermediary. To prevent an intermediary from reading the content of messages, frames may agree on and use a shared secret encryption key to encrypt messages. This key may be created by passing tokens between frames that want to securely communicate.

27 Claims, 9 Drawing Sheets

ENCRYPTED CROSS-ORIGIN COMMUNICATION VIA AN INTERMEDIARY

BACKGROUND

Frames may allow a web browser window to be divided into more than one section, each of which may display a different document. One use of frames may be to allow documents from different web domains to be displayed on a single web page. As such, a user that browses to a web page hosted on a particular web domain, sometimes referred to as the parent page, may end up viewing a page that contains documents from multiple web domains. Furthermore, domains that host the content in the frames may not be familiar with and, therefore, may not trust the domain that hosts the parent page.

Frames present on a parent page may want to pass messages between one another. This inter-frame communication is often referred to as cross-document messaging. For example, a document contained in a frame may want to communicate some piece of information to another document contained in a different frame and residing on a different domain. Without a direct line of communication between frames of different origins, the parent page must relay messages from one child frame to another child frame. A parent page that relays messages between the frames may view content that is passed between the frames. This content, therefore, may be exposed to an untrusted and potentially malevolent website. One way modern browsers may resolve this potential security hole is to use the postMessage method present in the Messaging API of HTML5 for secure cross messaging between frames. Older browsers, however, may not support the postMessage method and may not have a way for secure cross-document messaging.

BRIEF SUMMARY

Disclosed embodiments relate generally to secure cross-document messaging between frames in a web browser via an intermediary. The intermediary may be a parent page that contains the frames that want to communicate. To communicate securely, the frames may each have access to a shared secret key. One frame, designated the master frame, may create one or more tokens that may be encrypted using a pre-determined shared secret key. These tokens may, for example, be strings and may each contain similar information.

In one embodiment, a computer-implemented method for encrypted messaging between frames of a website may comprise generating a first token and a second token associated with a first frame of a website, wherein each of the first and second tokens includes information used to create a second frame of a website. The method may further comprise encrypting, with a processor, each of the first token and second token, sending the first token to a web server for creation of a second frame, receiving a responsive token from the web server, and comparing the responsive token to the encrypted second token to determine whether the second frame was created.

In another embodiment, a computer-implemented method for encrypted messaging between frames of a website, may comprise receiving, in a memory, a first token associated with a first frame of a website, the first token originating at a first web server. The method may further comprise decrypting, with a processor, the first token, the decrypted first token including information used to create a second frame of a website, generating a responsive token using the information included in the first token, encrypting the responsive token, and sending the encrypted responsive token to a second web server to confirm creation of the second frame with the first web server.

In yet another embodiment, a computer-implemented method for encrypted messaging between frames of a website may comprise generating, with a processor, a first token associated with a first frame of a website, wherein the first token includes a nonce, a timestamp, a child number, a first string value, and a number of children. The method may further comprise generating, with the processor, a second token associated with the first frame, wherein the second token includes the nonce, the timestamp, the child number, and a second string value, generating, with the processor, a third token associated with the first frame, wherein the third token includes the nonce, the timestamp, the child number, and a third string value, encrypting each of the first, second, and third tokens associated with the first frame using a first encryption key, sending the encrypted first token to a web server for creation of a second frame of a website, receiving a responsive token from the web server, and comparing the encrypted second token with the responsive token to determine whether the second frame was created.

In yet another embodiment, a computer-implemented method for encrypted messaging between frames of a website may comprise receiving, in a memory, a first token associated with a first frame of a website, the first token originating at a first web server. The method may further comprise decrypting the first token, the decrypted first token including a nonce, a timestamp, a child number, a first string value, and a number of children, generating a second token, wherein the second token includes the nonce, the timestamp, the child number, and a second string value, generating a third token, wherein the third token includes the nonce, the timestamp, the child number, and a third string value, encrypting the second and third tokens using a first encryption key, and sending the encrypted second token to a web server to confirm creation of a second frame with the first server.

DETAILED DESCRIPTION

Aspects of the disclosure relate generally to secure cross-document messaging between frames in a web browser via an intermediary. The intermediary may be a parent page that contains the frames that want to communicate. To communicate securely, the frames may each have access to a shared secret key. One frame, designated the master frame, may create one or more tokens that may be encrypted using a pre-determined shared secret key. These tokens may, for example, be strings and may each contain similar information.

Figure 1:
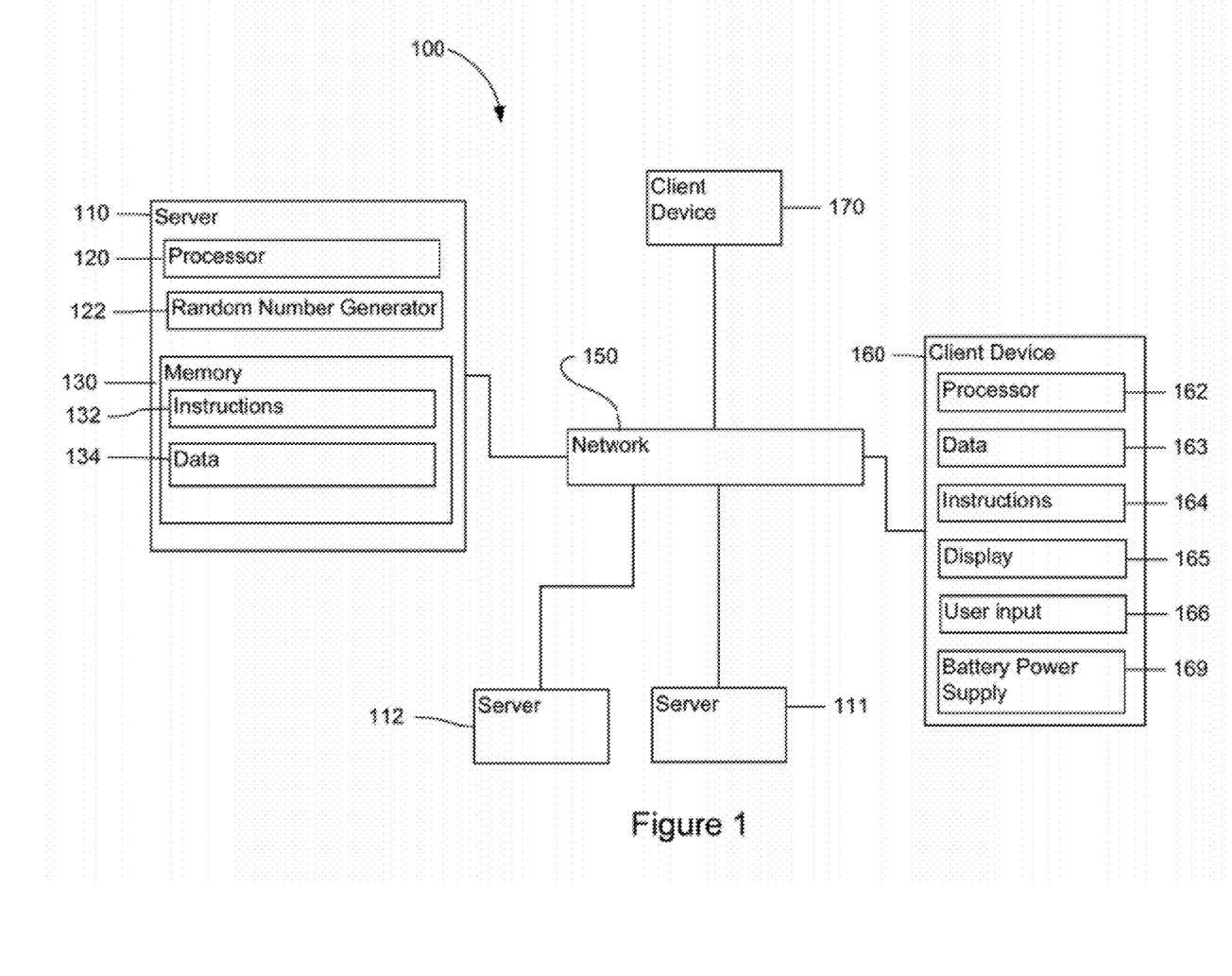
FIG. 1 is a functional diagram of a system according to one embodiment.
Figure 2:
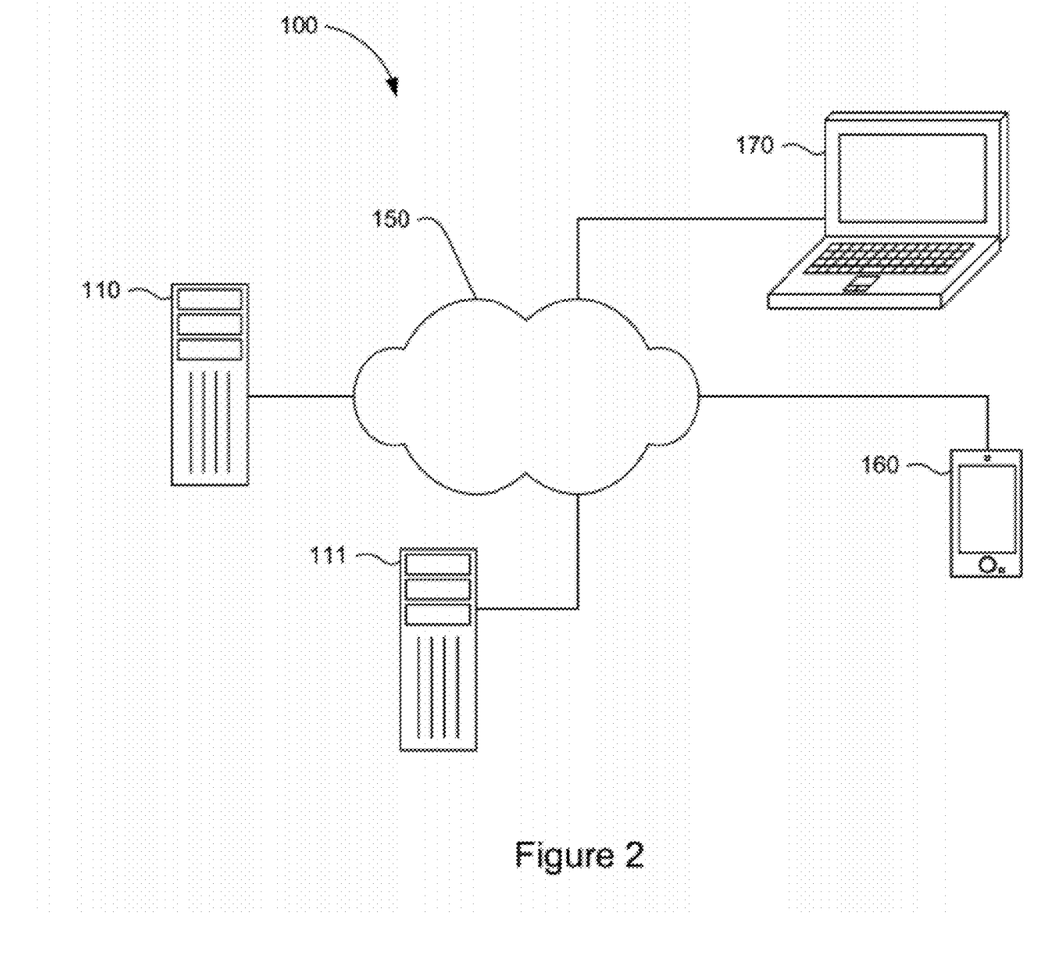
FIG. 2 is a pictorial diagram of the system of FIG. 1.

As shown in FIGS. 1-2, a system 100 in accordance with one aspect of the present technology includes a computer 110 containing a processor 120, memory 130 and other components typically present in general purpose computers.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Similarly, computer 110 may comprise a web server that is capable of receiving data from another web server 111 such that server 110 uses network 150 to transmit information to server 111. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

The computer 110 may optionally include a random number generator 122. The random number generator may be one or more dedicated chips that may be interconnected to either the processor 120, memory 130, or both. Alternatively, the random number generator 122 may be one or more software modules that reside in its own memory that may be of any type of memory capable of storing information and may be interconnected to either the processor 120, memory 130, or both. Though FIG. 1 functionally illustrates the random number generator 122 and memory 130 as being within different blocks, the random number generator may be part of the data and instructions of the memory 130.

Each client device may be configured similarly to the server 110, with a processor, memory and instructions as described above. Each client device 160 or 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), user input 166 (e.g., a mouse, keyboard, touch-screen or microphone), a battery power supply 169 or other power source, a network interface device, and all of the components used for connecting these elements to one another.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information, e.g., using a small keyboard, a keypad or a touch screen.

In addition to the operations described below and illustrated in the figures, various operations in accordance with aspects of the present technology will now be described. It should also be understood that the following operations do not have to be performed in the precise order described below.

Rather, various steps can be handled in a different order or simultaneously. Steps may also be removed or added.

Figure 3:
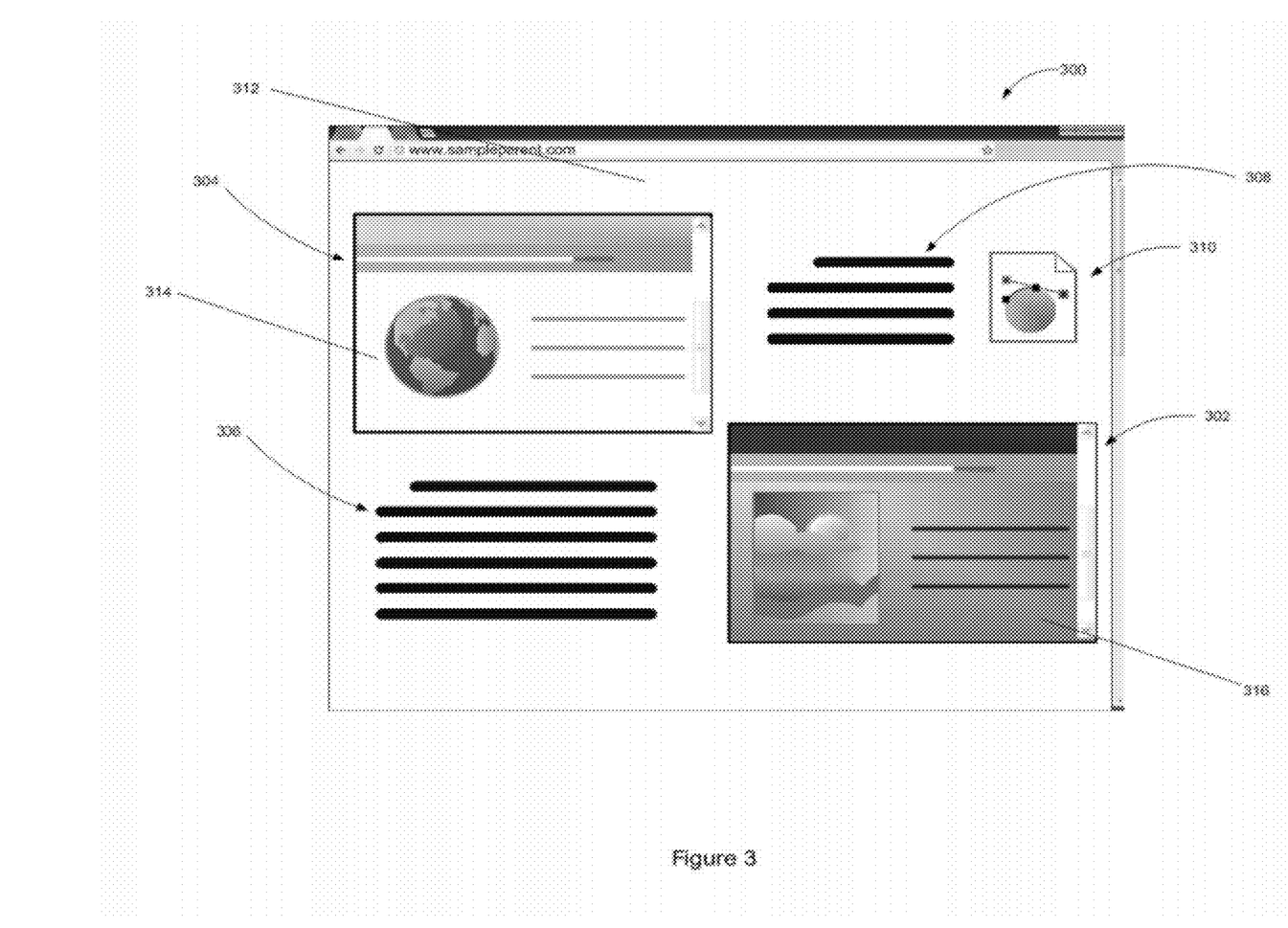
FIG. 3 is an exemplary screenshot according to aspects of the disclosure.

FIG. 3 is an exemplary screen shot of a web page 312 displayed in a browser 300 of a client device 160. In addition to having text 306 and 308 and an image 310, the exemplary web page 312 includes two frames 302 and 304. The frames 302 and 304 may be embedded into the web page 312. For example, the frames 302 and 304 may be HTML iframes and may contain web pages 314 and 316 hosted on different domains than web page 312.

Figure 4:
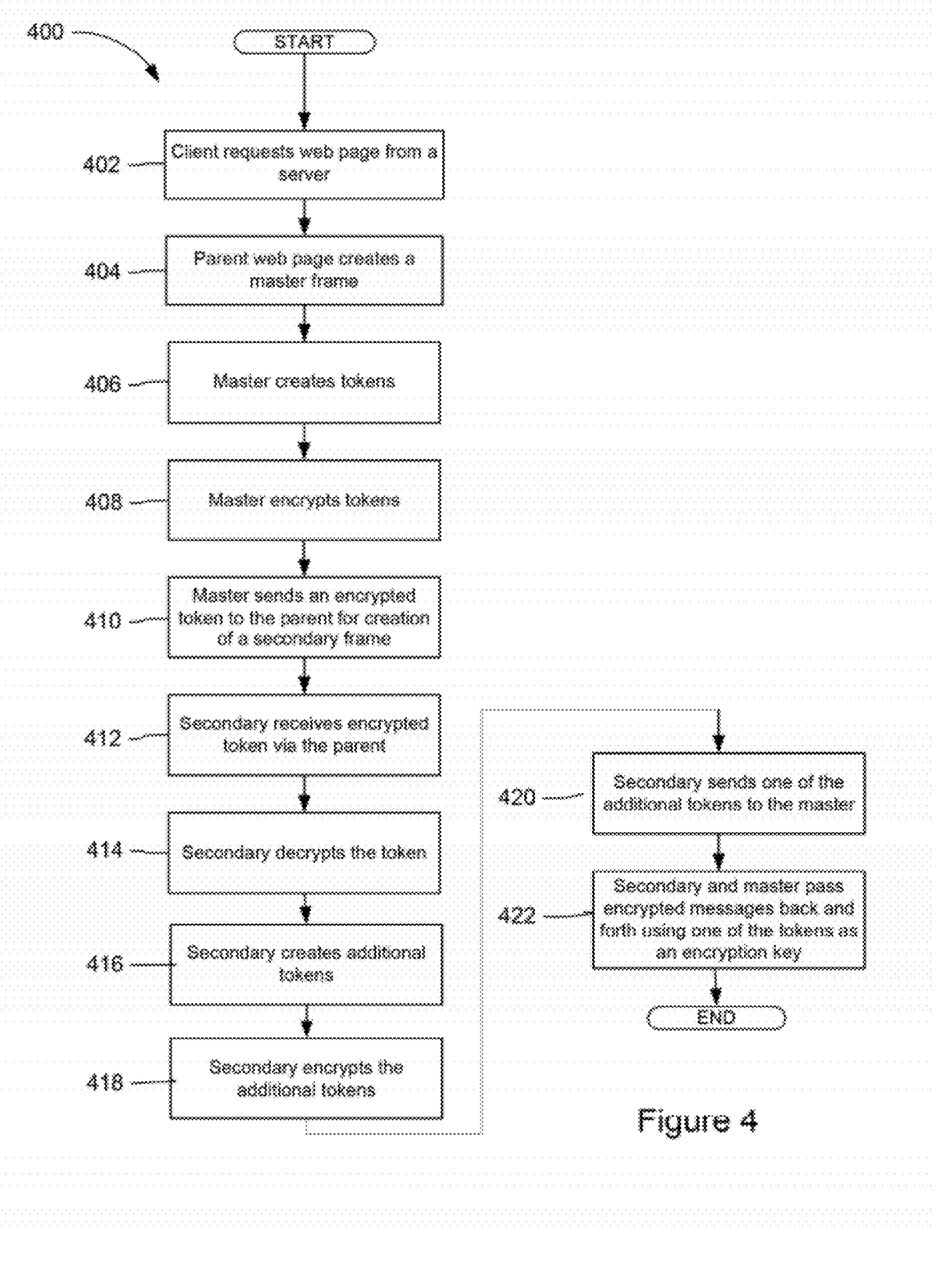
FIG. 4 is an exemplary flow diagram according to aspects of the disclosure.

FIG. 4 is an exemplary logic flow 400 for secure communication among frames. At block 402, a client device 160 may request and receive a web page from a server 110. The server 110 may return a parent web page 312 that includes multiple frames 302 and 304 embedded within the parent web page 312. Furthermore, each frame 302 and 304 may contain a child web page 314 and 316 that may reside on different web domains from the parent web page 312. Moreover, any communication between frames 302 and 304 may travel through the parent web page's server 110 (herein, the parent server). As such, the parent server 110 may see the content of any communication between frames 302 and 304 but may reside on a web domain that is untrusted by the domains hosting the child web pages 314 and 316. Because the parent may be hosted on an untrusted domain, the frames 302 and 304 may need to pass messages from one another without the parent server 110 seeing the content of the messages.

At block 404, the parent web page 312 may create a new frame 302, such as, for example, an HTML iframe. This frame 302 may be referred to as the "master frame" and may initiate creation of other frames. Furthermore, this frame may contain a web page 314 that may be on a server 111 (herein, the master server) from a different domain than the parent server 110.

At block 406, the master server 111 may create tokens for creation of secondary frames. In one embodiment, the master server 111 may create three or more tokens for each additional frame 304 (herein, secondary frames) on the parent webpage 312. In another embodiment, the master server 111 may create the three or more tokens for each of a subset of the secondary frames on the parent web page 312. In yet another embodiment, parent web page 312 may include multiple master frames that each create three or more tokens for a subset of secondary frames.

Figure 5:
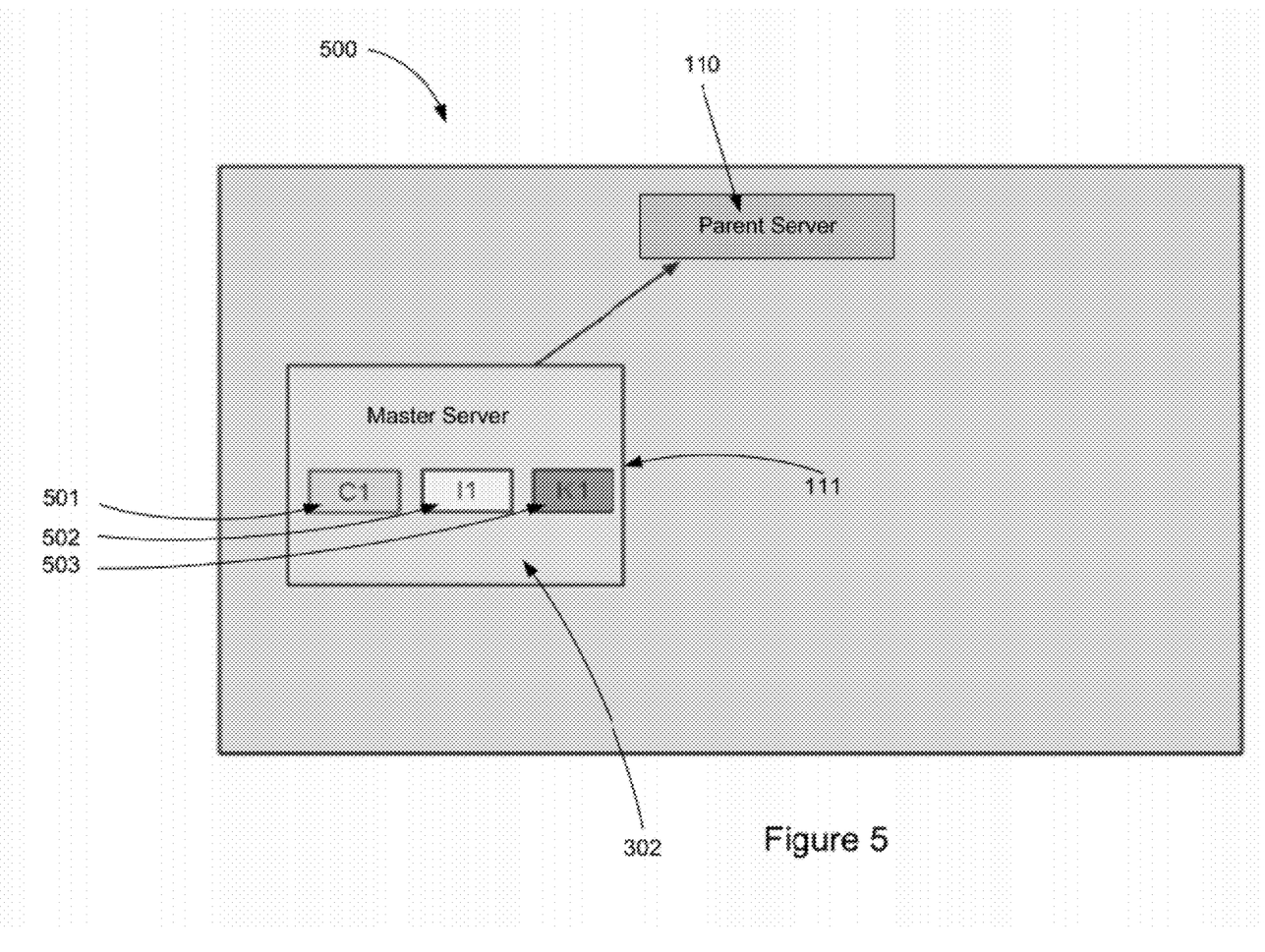
FIG. 5 is an exemplary diagram according to aspects of the disclosure.

FIG. 5 is a sample diagram of a state of a system 500 after the master frame 302 is loaded. As shown in FIG. 5, the master server 111 may create three tokens for master frame 302: (1) a FrameCreationToken 501; (2) a FrameIdentityToken 502; and (3) a FrameMessageToken 503. Each of these tokens may, for example, be a string of ASCII characters that may use a delimiter to separate different parts of the token. The three tokens created by the master server 111 may each contain information used to create secondary frames. For example, each token may include a nonce, timestamp, and child number. Additionally, each token may include a string unique to the token, such as, for example, "create" for the FrameCreationToken 501, "identify" for the FrameIdentityToken 502, and "key" for the FrameMessageToken 503. Furthermore, the FrameCreationToken 501 may include the total number of secondary frames.

At block 408, the master server 111 may encrypt each of the tokens using an encryption key. In one embodiment, the encryption scheme may be symmetric, such as, for example, the Advanced Encryption Standard (AES). In another embodiment, the encryption scheme may be asymmetric, such as, for example, RSA. In one embodiment, if a symmetric key exchange is used, the encryption key may be a key that is agreed to and stored on both the master server 111 and any secondary servers 112 with which the master server 111 may communicate. In another embodiment, a key may be exchanged using a key exchange protocol, such as, for example, the Diffie-Hellman or Station-to-Station key exchange. In yet another embodiment, the encryption key could exchanged via a secure back channel.

Figure 6:
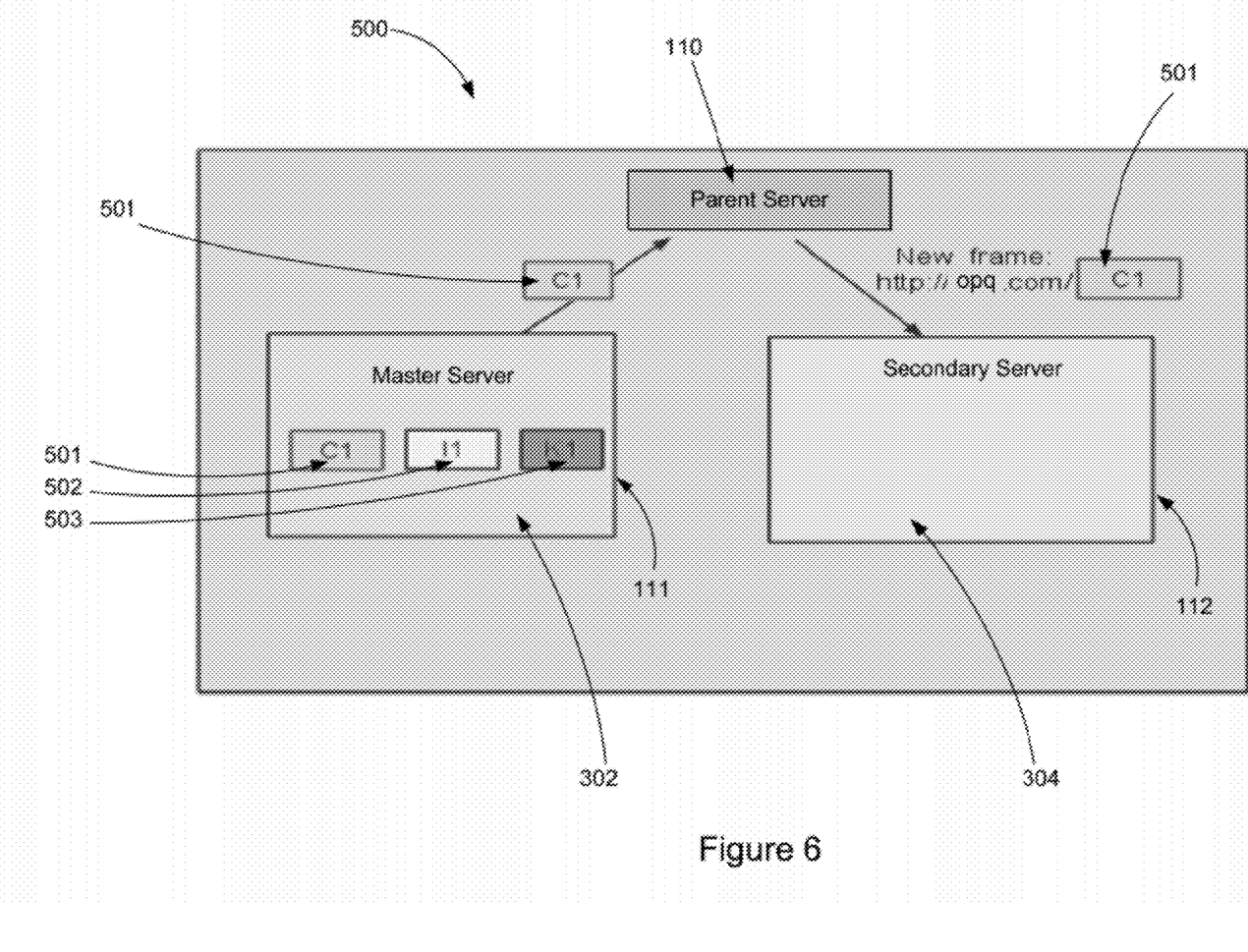
FIG. 6 is an exemplary diagram according to aspects of the disclosure.

At block 410, the master server 111 may send the encrypted FrameCreationToken 501 to the parent server 110 via a request. The parent server 110 may use the encrypted FrameCreationToken 501 to create a secondary frame 304. For example, the encrypted FrameCreationToken 501 may be included in a URL when secondary frame 304 is created via a request to secondary server 112. FIG. 6 is a sample diagram of a state of a system when a request is made to secondary server 112. In this example, an encrypted FrameCreationToken 501 is sent to parent server 110, which may use the encrypted FrameCreationToken 501 to generate a secondary frame 304.

At block 412, the secondary server 112 may retrieve the encrypted FrameCreationToken 501 from the parent server 110 for creation of secondary frame 304. The secondary server 112 may host or retrieve the content, such as a web page, that will be contained in secondary frame 304. As illustrated in FIG. 6, the secondary server 112 may retrieve the encrypted FrameCreationToken 501 via the URL contained in a request from parent server 110. If using an asymmetric encryption scheme to encrypt the tokens, the master server 111 may also send its public key to the secondary server 112 along with the request to create the secondary frame 304. Additionally, the secondary server 112 may receive a cookie created by a server in its domain that may allow the server 112 to verify that the encrypted FrameCreationToken 501 came from the client device 160.

At block 414, the secondary server 112 may decrypt the encrypted FrameCreationToken 501 using the appropriate key. For example, if the master server used a symmetric key to encrypt the FrameCreationToken 501, the secondary server 112 may use the same symmetric key to decrypt and retrieve the FrameCreationToken 501.

Figure 7:
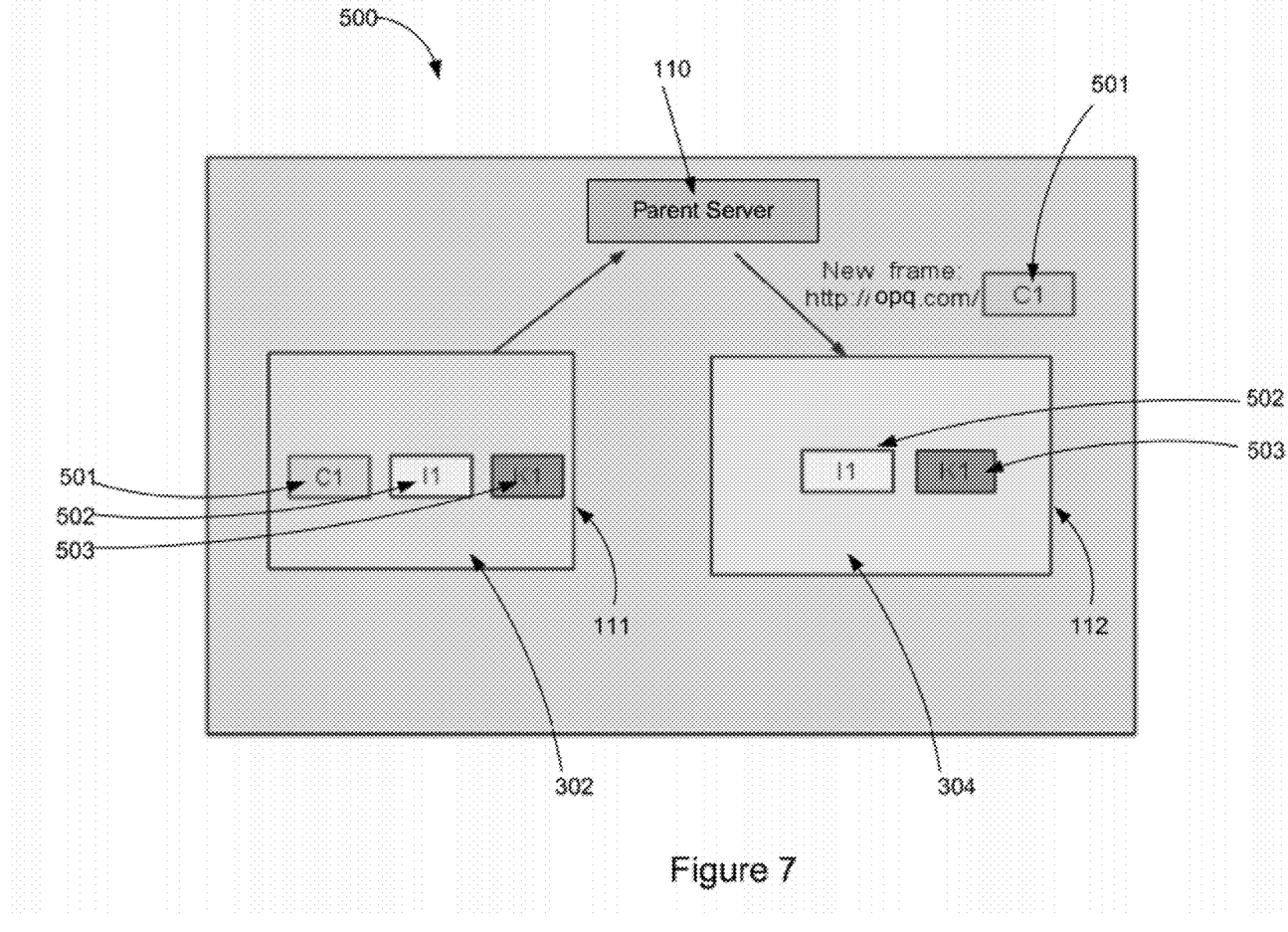
FIG. 7 is an exemplary diagram according to aspects of the disclosure.

At block 416, the secondary server 112 may use the FrameCreationToken 501 to recreate any additional tokens created by the master server 111. For example, the secondary server 112 may derive both the FrameIdentityToken 502 and FrameMessageToken 503 from the FrameCreationToken 501. If the FrameCreationToken 501 includes fields known only by the master server 111 (e.g., nonce, timestamp, and child number), the secondary server 112 identifies those fields and may use them to recreate the FrameIdentityToken 502 and FrameMessageToken 503 created by the master server 111. Additionally, if the master server 111 includes any other fields known to both the master server 111 and secondary server 112 (e.g., a unique string for each token), the secondary server 112 may include those fields when recreating FrameIdentityToken 502 and FrameMessageToken 503. FIG. 7 is a sample diagram of a state of a system 500 after the secondary server 112 recreates a FrameIdentityToken 502 and FrameMessageToken 503.

At block 418, the secondary server 112 may encrypt each of the tokens using an encryption key. In one embodiment, if the encryption scheme used by the master server 111 is symmetric, the secondary server 112 may use the same key used by the master server. In another embodiment, if the encryption scheme used by the master server 111 is asymmetric, the secondary server may use the corresponding public-private key pair.

Figure 8:
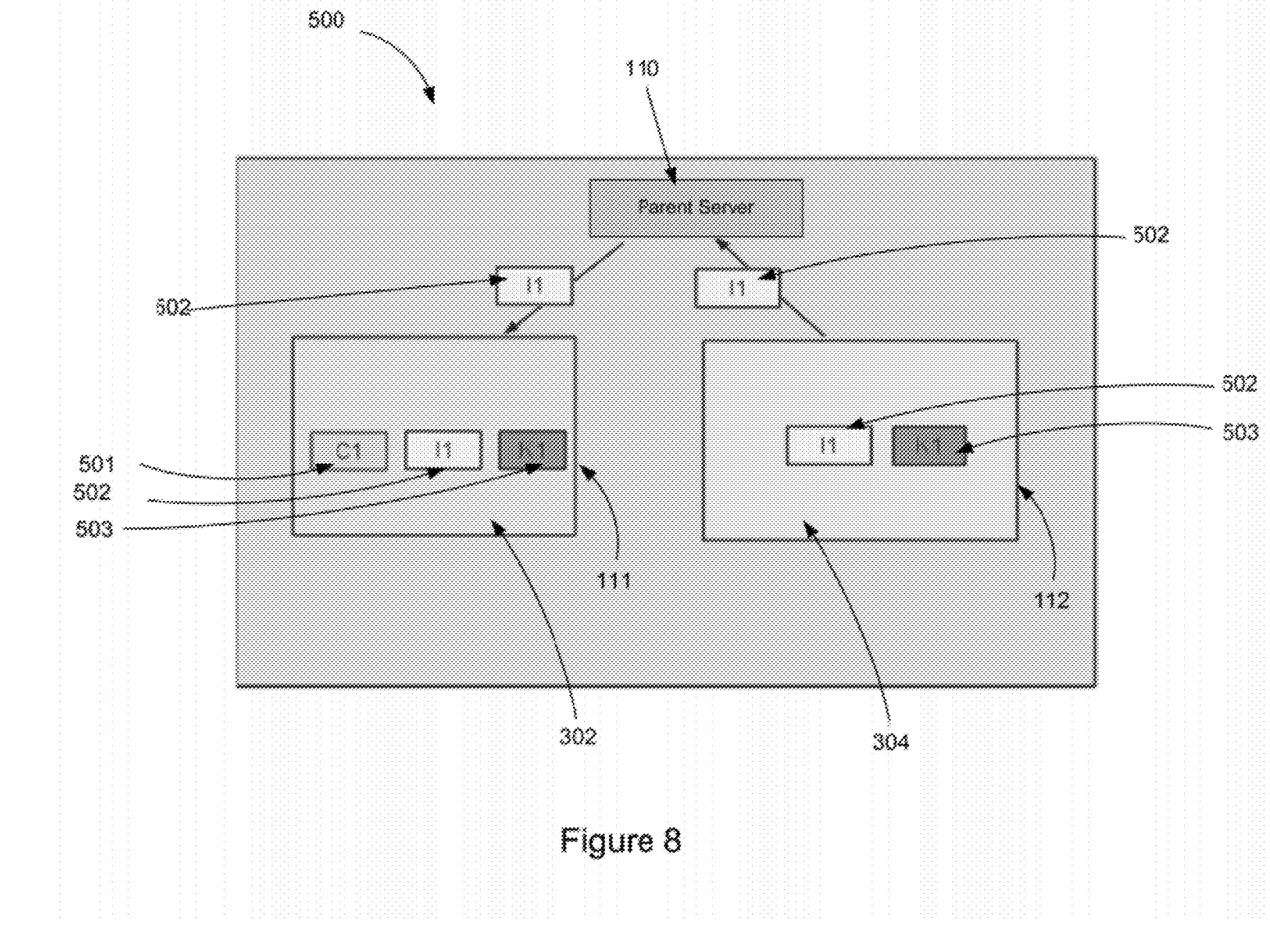
FIG. 8 is an exemplary diagram according to aspects of the disclosure.

At block 420, the secondary server 112 may send one of the tokens, such as, for example, the encrypted FrameIdentityToken 502, to the master server 111. In one embodiment, the secondary server 112 sends the token to the master server 111 directly. In another embodiment, the token is sent via the parent server 110. When the master server 111 receives the token from the secondary server 112, the master server compares the received token to the token it generated at block 406. This comparison may be performed on either the encrypted or unencrypted tokens. Once the master server 111 verifies that the received token matches one of its generated tokens, the master server 111 may be confident that the secondary frame 304 was created successfully. FIG. 8 is a sample diagram of a state of a system 500 after the secondary server 112 sends the FrameIdentityToken 502 to the master server 111 via the parent server 110.

At block 422, either the master frame 302 or secondary frame 304 may initiate sending messages. The master frame 302 and secondary frame 304 may encrypt messages using one of the tokens generated by the master server 111 as a key. For example, each message may be encrypted using a FrameMessageToken 503 as a key. Furthermore, the FrameMessageToken 503 may be encrypted prior to being used as a key. For example, the FrameMessageToken 503 may be encrypted using the same encryption key used to encrypt the FrameCreationToken 501 and FrameIdentityToken 502. The encryption scheme used to encrypt each message with the FrameMessageToken 503 may be the same or a different scheme than the encryption scheme used to encrypt the tokens.

Figure 9:
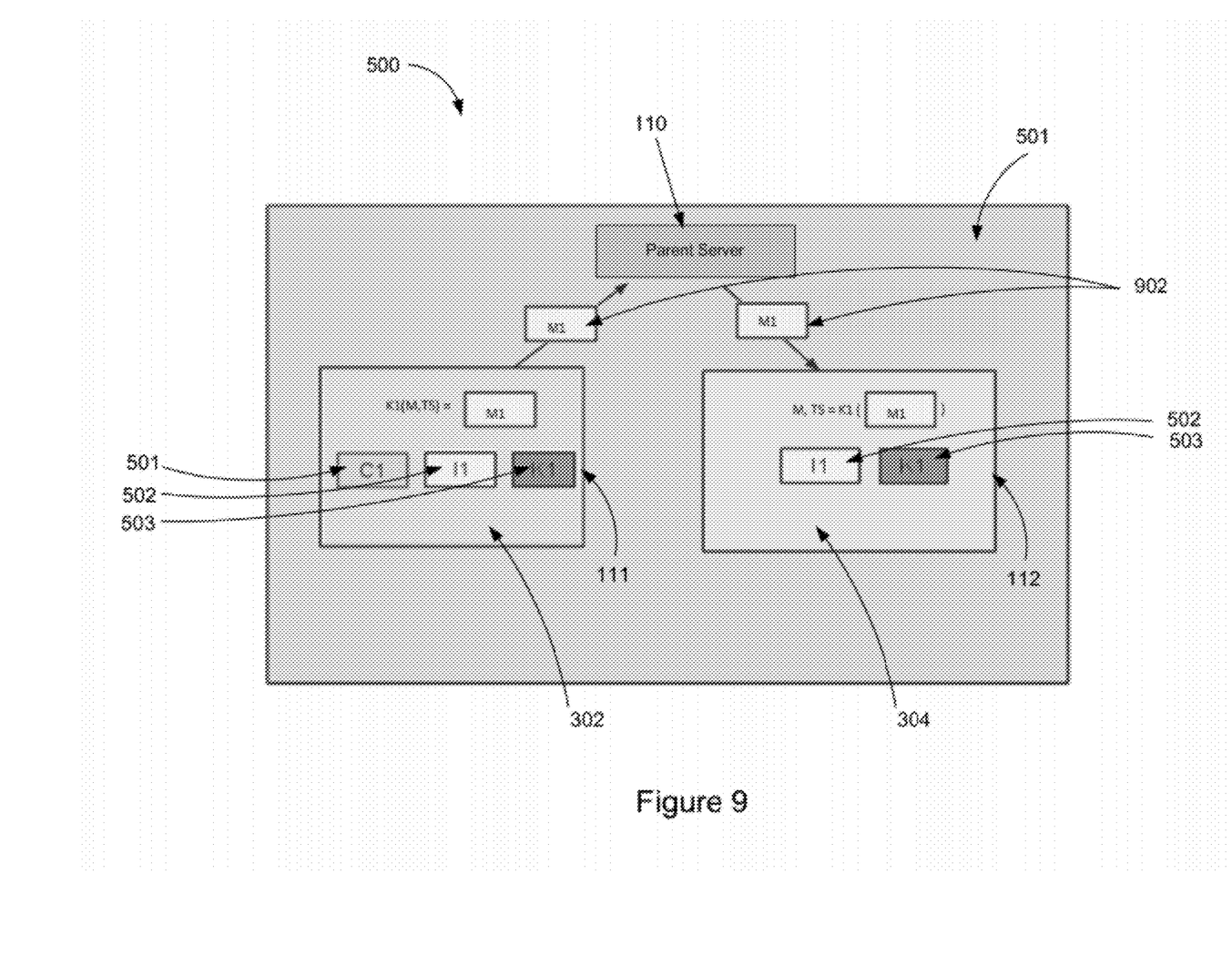
FIG. 9 is an exemplary diagram according to one embodiment.

FIG. 9 is a sample diagram of a state of a system 500 after a secondary frame 304 receives an encrypted message from a master frame 302. In this example, a master frame 302 may send a message 902 to a secondary frame 304. Additionally, the master frame 304 may append other information to the message, such as, for example, a timestamp. A master frame 302 may also encrypt one or both the message and appended information using an encryption key, such as, a FrameMessageToken 503. When a secondary frame 304 receives the message 902, the frame 304 may decrypt the message using the appropriate encryption key. For example, if a symmetric key is used to encrypt the message 902, the same key may be used to decrypt message 902.

One advantage of the disclosure is to allow secure communication within older browsers that do not support postMessage or similar methods found in modern browsers. Additionally, the security settings in some browsers do not allow frame-to-frame communication. Therefore, in some browsers, it may be necessary to pass messages via an untrusted parent server. In the process described in FIG. 4, parent server 110 cannot access the content of the encrypted messages passed between frames. Because the parent server does not have access to any keys shared between frames, the encrypted messages allow the frames to communicate via the parent server without exposing the communications to a potentially untrusted third party.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method for encrypted messaging between frames of a website, comprising:
generating a first token and a second token associated with a first frame of a website, wherein each of the first and second tokens includes information used to create a second frame of a website;
encrypting, with a processor, each of the first token and second token;
sending the first token to a web server for creation of a second frame;
receiving a responsive token from the web server; and
comparing the responsive token to the encrypted second token to determine whether the second frame was created.

2. The method of claim 1, wherein the first and second tokens each include a nonce, a first timestamp, and a frame number.

3. The method of claim 1, wherein the responsive token is encrypted, and the comparing includes decrypting the responsive token and comparing the responsive token to the second token.

4. The method of claim 1, wherein the first and second frames are iframes.

5. The method of claim 4, further comprising:
generating a third token associated with the first frame, the third token including information used to create the second frame.

6. The method of claim 5, wherein the third token includes a nonce, a timestamp, and a frame number.

7. The method of claim 6, wherein the third token is encrypted.

8. The method of claim 7, further comprising:
encrypting a message using the encrypted third token as an encryption key; and
sending the encrypted message to the server for delivery to the second frame.

9. The method of claim 8, wherein the message includes a second timestamp.

10. The method of claim 6, further comprising:
receiving, from the server, a message associated with the second frame; and
decrypting the message using the third token as a decryption key.

11. The method of claim 10, wherein the message is decrypted using the encrypted third token as a key.

12. The method of claim 1, wherein the first token is sent as a portion of a URL.

13. A computer-implemented method for encrypted messaging between frames of a website, comprising:
receiving, in a memory, a first token associated with a first frame of a website, the first token originating at a first web server;
decrypting, with a processor, the first token, the decrypted first token including information used to create a second frame of a website;
generating a responsive token using the information included in the first token;
encrypting the responsive token; and
sending the encrypted responsive token to a second web server to confirm creation of the second frame with the first web server.

14. The method of claim 13, further comprising:
generating a second token using information included in the first token; and
encrypting the second token.

15. The method of claim 13, wherein the first and second frames are iframes.

16. The method of claim 14, wherein the first, second, and responsive tokens each include a nonce, a first timestamp, and a frame number.

17. The method of claim 16, further comprising:
receiving, in the memory, a message associated with the first frame, the message originating at the first server; and
decrypting the message using the second token as a decryption key.

18. The method of claim 16, further comprising:
encrypting a message using the encrypted second token as an encryption key; and
sending the encrypted message to the server for delivery to the first frame.

19. The method of claim 18, wherein the unencrypted second token is used to encrypt the message.

20. The method of claim 18, wherein the message includes a second timestamp.

21. A computer-implemented method for encrypted messaging between frames of a website, comprising:
generating, with a processor, a first token associated with a first frame of a website, wherein the first token includes a nonce, a timestamp, a child number, a first string value, and a number of children;
generating, with the processor, a second token associated with the first frame, wherein the second token includes the nonce, the timestamp, the child number, and a second string value;
generating, with the processor, a third token associated with the first frame, wherein the third token includes the nonce, the timestamp, the child number, and a third string value;
encrypting each of the first, second, and third tokens associated with the firs same using a first encryption key;
sending the encrypted first token to a web server for creation of a second frame of a website;
receiving a responsive token from the web server; and
comparing the encrypted second token with the responsive token to determine whether the second frame was created.

22. The method of claim 21, wherein the responsive token is decrypted using the first encryption key and compared to the unencrypted second token.

23. The method of claim 21 further comprising:
generating an encrypted message using the encrypted third token as a second encryption key; and
sending the encrypted message to the server for delivery to the second frame.

24. The method of claim 21 further comprising:
receiving, from the server, a message associated with the second frame; and
decrypting the message using the encrypted third token as a decryption key.

25. A computer-implemented method for encrypted messaging between frames of a website, comprising:
receiving, in a memory, a first token associated with a first frame of a website, the first token originating at a first web server;
decrypting the first token, the decrypted first token including a nonce, a timestamp, a child number, a first string value, and a number of children;
generating a second token, wherein the second token includes the nonce, the timestamp, the child number, and a second string value;
generating a third token, wherein the third token includes the nonce, the timestamp, the child number, and a third string value;
encrypting the second and third tokens using a first encryption key; and
sending the encrypted second token to a web server to confirm creation of a second frame with the first server.

26. The method of claim 25 further comprising:
generating an encrypted message using the encrypted third token as a second encryption key; and
sending the encrypted message to the server for delivery to the first frame.

27. The method of claim 25 further comprising:
receiving, from the server, a message associated with the first frame; and
decrypting the message using the encrypted third token as a decryption key.

* * * * *

UNITED STATES PATENT AND TRADEMARK OFFICE
CERTIFICATE OF CORRECTION

| | | Page 1 of 1 |
|---|---|---|
| PATENT NO. | : 8,347,083 B1 | |
| APPLICATION NO. | : 13/343205 | |
| DATED | : January 1, 2013 | |
| INVENTOR(S) | : Jeffrey William Scudder | |

It is certified that error appears in the above-identified patent and that said Letters Patent is hereby corrected as shown below:

In the Claims:

Claim 21, Col. 9, Line 34, "firs same" should read -- first frame --.

Signed and Sealed this
First Day of July, 2014

Michelle K. Lee
*Deputy Director of the United States Patent and Trademark Office*